(12) United States Patent
Fukuda et al.

(10) Patent No.: US 7,703,410 B2
(45) Date of Patent: Apr. 27, 2010

(54) VEHICLE GAUGE HAVING A POINTER CONFIGURED TO TRAVEL ABOUT A GAUGE FACE

(75) Inventors: Taisei Fukuda, Shizuoka (JP); Tomohiro Sugiyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 115 days.

(21) Appl. No.: 12/068,800

(22) Filed: Feb. 12, 2008

(65) Prior Publication Data

US 2008/0223283 A1    Sep. 18, 2008

(30) Foreign Application Priority Data

Mar. 16, 2007    (JP) .............................. 2007-069551

(51) Int. Cl.
  *G01D 13/22* (2006.01)
  *G01D 13/00* (2006.01)
(52) U.S. Cl. ...................................... 116/282; 116/62.4
(58) Field of Classification Search ................. 116/261, 116/262, 281, 282, 283, 62.1, 62.4
See application file for complete search history.

(56) References Cited

U.S. PATENT DOCUMENTS

| | | | | |
|---|---|---|---|---|
| 452,515 A | * | 5/1891 | Brown | ......................... 116/261 |
| 2,097,928 A | * | 11/1937 | Konig | ......................... 116/262 |
| 2,430,413 A | * | 11/1947 | Schulz | ......................... 116/272 |
| 2,556,875 A | * | 6/1951 | Hallstrand al. | .............. 116/262 |
| 2,905,139 A | * | 9/1959 | Wennerstrom | .............. 116/282 |
| 3,125,985 A | * | 3/1964 | Nallinger | ................... 116/62.1 |
| 3,964,049 A | * | 6/1976 | Remus | ........................ 340/317 |
| 4,024,767 A | * | 5/1977 | Kampf | ........................ 73/866.1 |
| 7,520,241 B2 | * | 4/2009 | Pala et al. | .................. 116/62.1 |

FOREIGN PATENT DOCUMENTS

| | | | |
|---|---|---|---|
| JP | 58050818 A | * | 3/1983 |
| JP | 2005-098751 | | 4/2005 |
| JP | 2008232676 A | * | 10/2008 |

* cited by examiner

*Primary Examiner*—R. A. Smith
(74) *Attorney, Agent, or Firm*—Edwards Angell Palmer & Dodge LLP (57) ABSTRACT

A gauge, including a gauge face having indicia; a pointer configured to indicate a position on the gauge face based on input received from measurement; and an instrument for driving the pointer. The instrument for moving the pointer includes a flexible member connected to the pointer; a first pulley configured to respectively wind up both ends of the flexible member; a control device for preventing the flexible member from deviating from the first pulley; a second pulley spaced apart from the first pulley and configured to roll up the center portion of the flexible member; a motor configured to rotate the first pulley based on input received from the measurement and to drive the pointer around the gauge face; and a tension member.

5 Claims, 8 Drawing Sheets

PRIOR ART

VEHICLE GAUGE HAVING A POINTER CONFIGURED TO TRAVEL ABOUT A GAUGE FACE

CROSS-REFERENCE TO RELATED APPLICATIONS

The present Application claims priority to Japanese Patent Application No. 2007-69551 filed on Mar. 16, 2007, the entire disclosure of which is expressly incorporated herein by reference.

BACKGROUND OF THE INVENTION (1) Field of the Invention

The present invention relates to a gauge used in, for example, vehicles or ships, and more particularly, a gauge having a pointer configured to travel across a gauge face based upon input received from measurement.

(2) Description of the Related Art

A moving body such as vehicle or ship is equipped with a gauge configured to display multiple types of information on a display field, and to be viewed by a user thereof. The gauge includes a combination meter comprising a speedometer for indicating a vehicle speed, a tachometer for indicating an engine speed, a fuel gauge for presenting fuel level information to user, a temperature gauge for indicating the temperature of cooling water, and so on.

Figure 7:
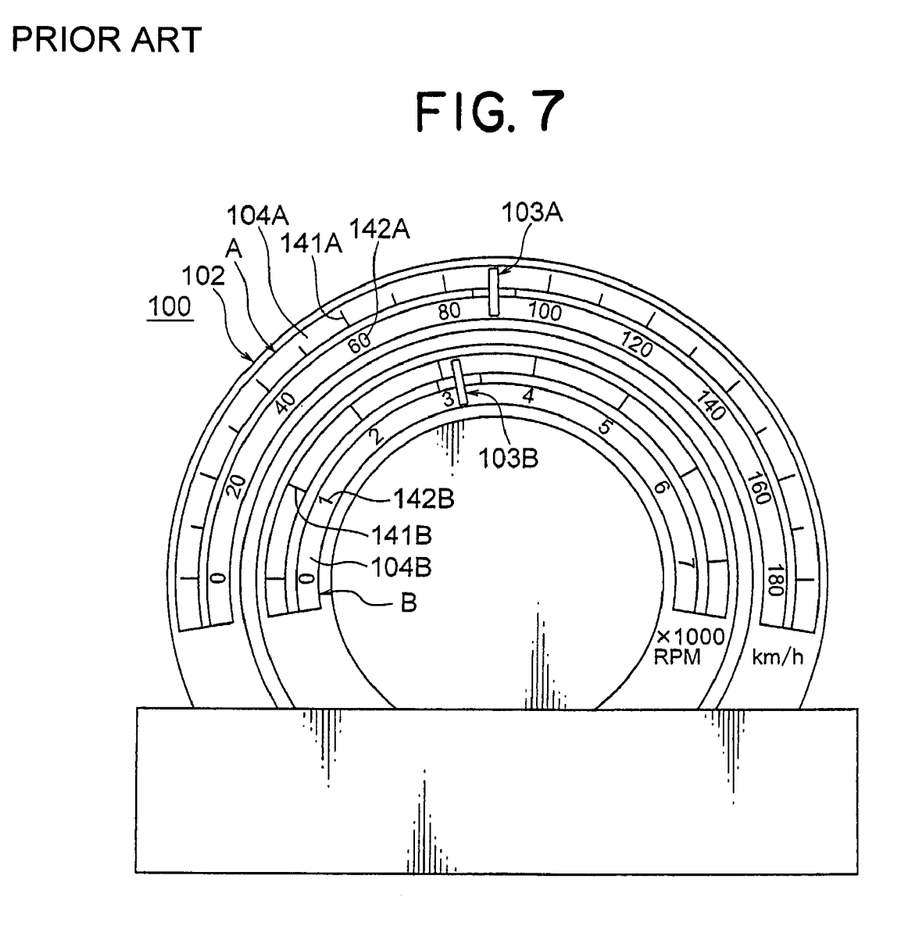
FIG. 7 is a plan view of a conventional combination meter.
Figure 8:
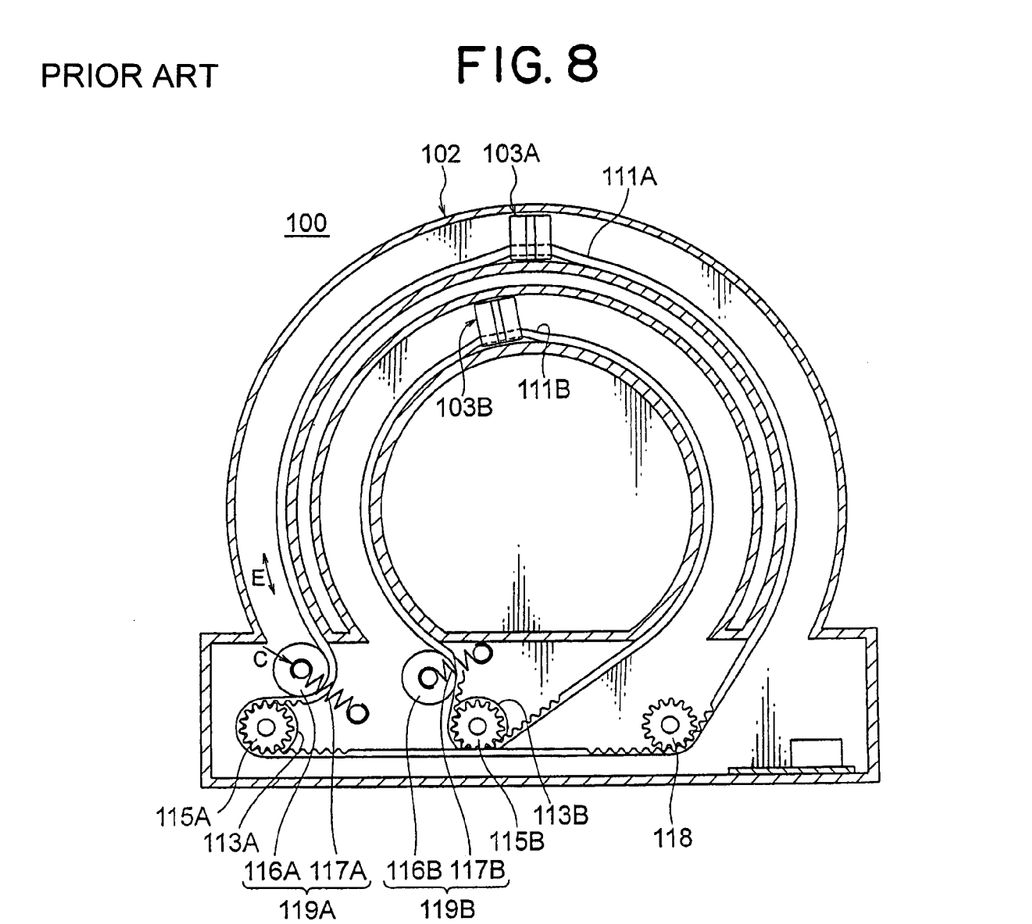
FIG. 8 is a cross-sectional view of the conventional combination meter of FIG. 7.

FIGS. 7 and 8 show one example of the foregoing conventional combination meter. This type of conventional combination meter is, for example, disclosed in Japanese Publication of Non-Examined Patent Application 2005-98751.

Referring to FIGS. 7 and 8, the vehicle combination meter 100 is shown to include a speedometer A, a tachometer B, and a case 102 for accommodating the speedometer A and the tachometer B.

The speedometer A is shown to include a dial face 104A having a display field consisting of scales 141A and numbers 142A arranged in an arcuate pattern, a pointer 103A configured to travel across the display field and to indicate a position on the display field, a loop belt 111a connected to the pointer 103A, a drive pulley 115A and a driven pulley 118 configured to move the loop belt 111A along its longitudinal direction (indicated by an arrow "E" in FIG. 8) in order to drive the pointer 103A, a motor 113A configured to rotate the drive pulley 115A based on input received from measurement, and a tension member 119A configured to provide the belt 111A with enough tension to prevent sag of the belt 111A.

The device 119A is shown to include a pulley 116A disposed in the outside of the periphery of the loop belt 111A, and a coil spring 117A pulling the pulley 116A toward the inside of the periphery of the loop belt 111A.

The tachometer B is shown to include indicia 141B arranged in an arcuate pattern, a dial face 104B including a display field having numbers 142A and disposed inside the dial face 104A, a pointer 103B configured to travel across the display field and to indicate a position on the display field, a loop belt 114B connected to the pointer 103B, a drive pulley 115B configured to move the loop belt 111A along its longitudinal direction (indicated by an arrow "E" in FIG. 8) in order to drive the pointer 103B, a motor 113B configured to rotate the drive pulley 115B based on input received from measurement, and a tension member 119B configured to provide the belt 111B with enough tension to prevent sag of the belt 111B.

The device 119B is shown to include a pulley 116B disposed outside of the periphery of the loop belt 111B, and a coil spring 117B pulling the pulley 116B toward the inside of the periphery of the loop belt 111B.

Because in the foregoing speedometer A the pointer 103A is driven by means of the belt 111A, there is a space in the center of the speedometer A. The tachometer B can be formed within the foregoing space. Moreover, each of the speedometer A and the tachometer B includes the tension members 119A and 119B respectively, thus preventing the sag of the belts 119A and 119B.

Meanwhile, in the foregoing combination meter 100 mainly used in vehicles, the tension members 119A and 119B are respectively configured to draft or pull the pulleys 116A and 116B by means of the coil springs 117A and 117B. With the foregoing construction, frictional resistance between a shaft for supporting the pulleys 116A and 116B and a shaft bearing is inclined to increase, and therefore the higher torque-motors 113A and 113B are required. Furthermore, the belts 111A and 111B cannot move smoothly, and thus allowing the imprecise pointing of the pointers 103A and 103B.

SUMMARY OF THE INVENTION

To solve the afore-mentioned problems, the present invention is intended to provide a gauge presenting the pointer at a precise position on the gauge face indicia and having a lightly loaded motor.

More specifically, in accordance with one embodiment of the present invention, there is provided a gauge, including a gauge face having indicia; a pointer configured to indicate a position on the gauge face based on input received from measurement; and an instrument for driving the pointer. The instrument for moving the pointer includes a flexible member connected to the pointer; a first pulley configured to respectively wind up both ends of the flexible member; a control device for preventing the flexible member from deviating from the first pulley; a second pulley spaced apart from the first pulley and configured to roll up the center portion of the flexible member; a motor configured to rotate the first pulley based on input received from the measurement and to drive the pointer around the gauge face; and a tension member configured to provide at least one end of the flexible member with sufficient tension to prevent sag or looseness of the flexible member disposed between the first pulley and the second pulley. In such a gauge, the length of the flexible member, which is uncoiled from the first pulley during the traveling of the pointer from its initial position, is longer than the traveling distance of the pointer.

In particular, the foregoing tension member may be a spring both ends of which are respectively coupled to the first pulley and to one end of the flexible member.

In particular, the foregoing tension member may be a motor operable to wind up the flexible member.

In particular, the foregoing tension member may be a spindle arranged for connection to one end of the flexible member.

In particular, the foregoing gauge may further include a winding-up pulley disposed between the first pulley and the second pulley, directly coupled to the motor, and configured to wind up the flexible member.

In particular, the foregoing indicia may be arranged in a linear pattern on the gauge face.

The foregoing summary, as well as the following detailed description of certain embodiments of the present invention, will be better understood when read in conjunction with the appended FIGS. 1 to 8. For the purpose of illustrating the invention, there is shown in the drawings, certain embodiments. It should be understood, however, that the present invention is by no means limited by the appended drawings.

DESCRIPTION OF EXEMPLARY EMBODIMENTS

Figure 1:
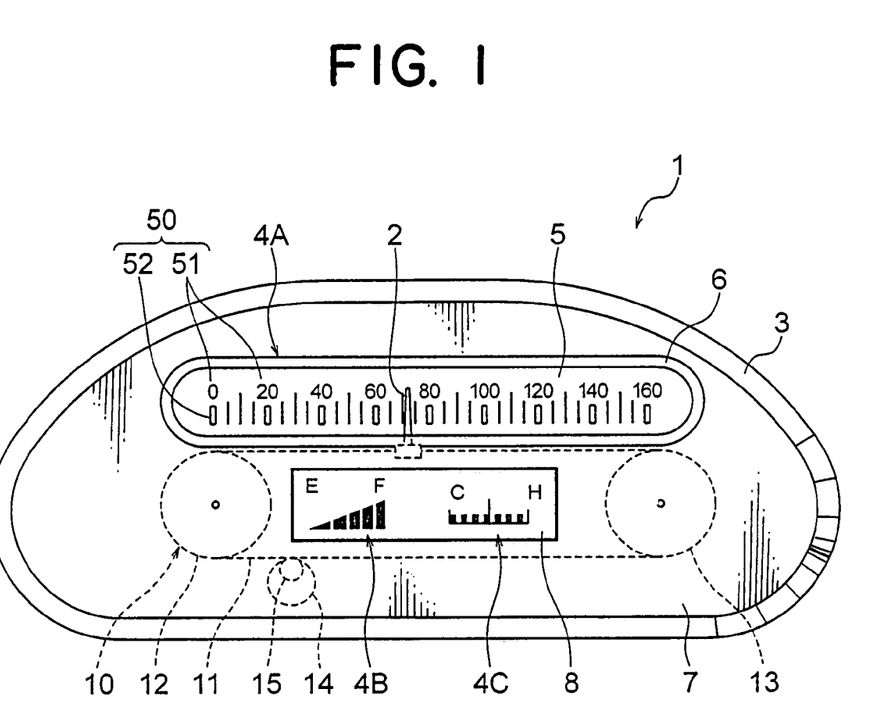
FIG. 1 is a plan view of a gauge in accordance with a first embodiment of the present invention.
Figure 2:
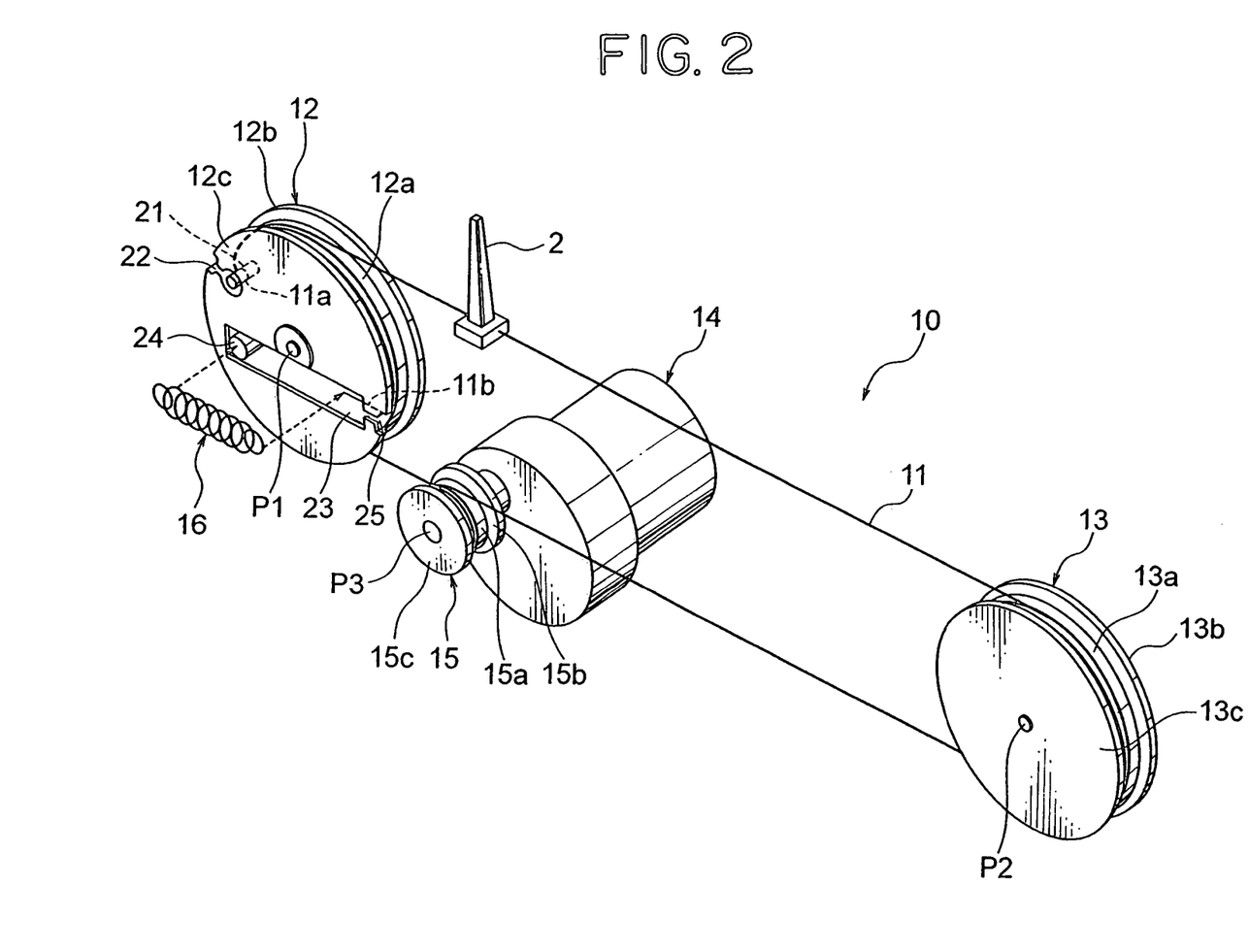
FIG. 2 is a perspective view of a moving instrument of the gauge of FIG. 1.
Figure 3:
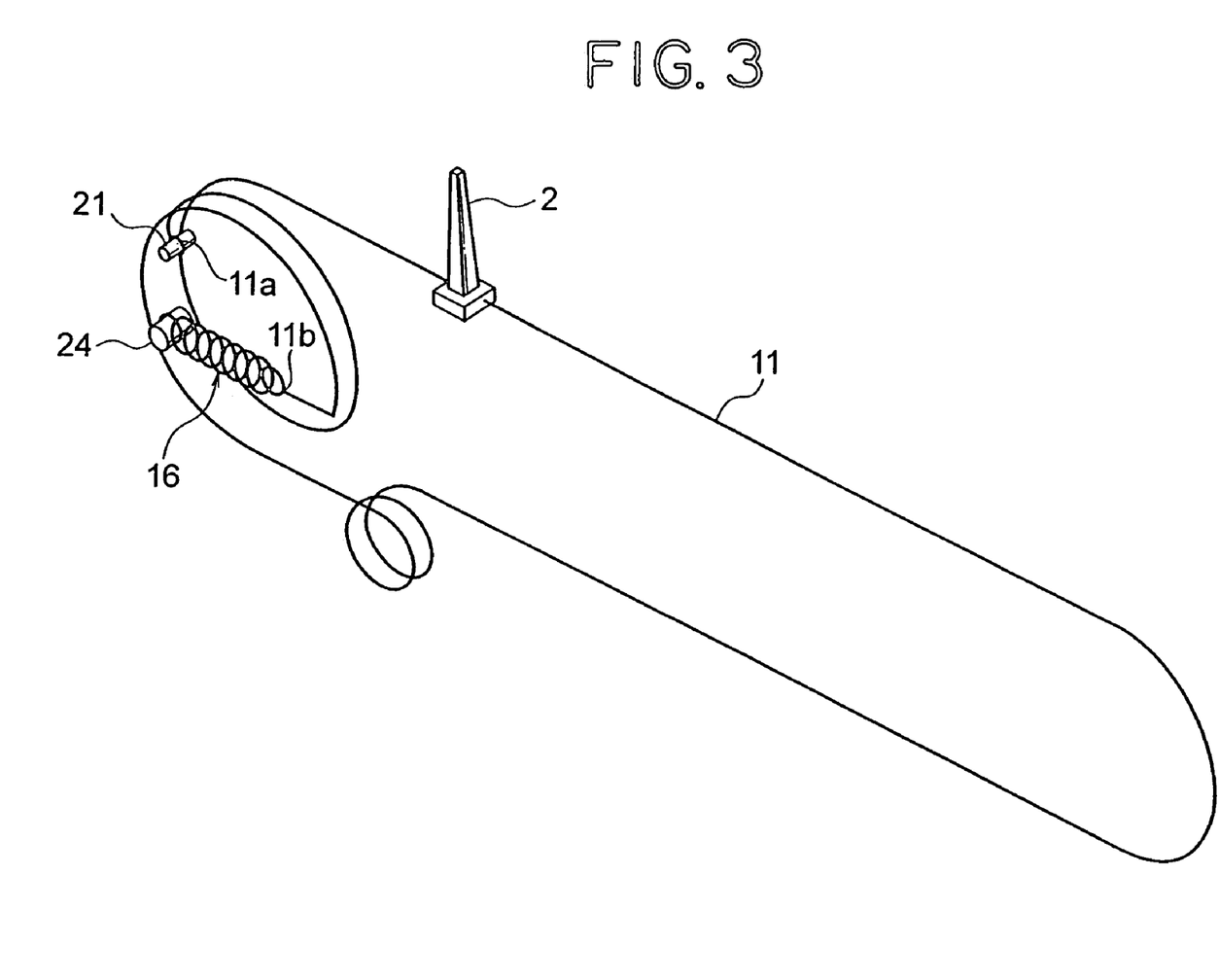
FIG. 3 is shown to illustrate the arrangement of a flexible member in the moving instrument of FIG. 2.

Referring now to FIGS. 1 to 3, a gauge in accordance with a first embodiment of the present invention will be illustrated in greater detail below. A vehicle combination meter 1 in accordance with the first embodiment of the present invention will be provided as a gauge mounted to vehicles such as automotives and presenting various types of information to the users of these vehicles.

As shown in FIG. 1, the combination meter 1 is shown to include a case 3, a speedometer 4A accommodated in the case 3, a fuel gauge 4B and a temperature gauge 4C displayed on a liquid crystal display 8 mounted to the case 3, a background panel 7, and a transparent cover member (now shown). The fuel gauge 4B is employed to present fuel level information to the users of vehicles. The temperature gauge 4C is employed to present the temperature of cooling water to the user of vehicles.

The case 3 is formed of synthetic resin, and has an opening in its surface facing toward the users. The opening of the case 3 is closed by the transparent cover. The case 3 accommodates the speedometer 4A, the liquid crystal display 8, the background panel 7 and so on therein.

The background panel 7 is provided with a window for exposing a gauge face 5 of the speedometer 4A and the liquid crystal display 8 to the users. The background panel 7 is disposed between the transparent cover and the gauge face 5 (and/or the liquid crystal display 8), and thus can effectively prevent the other portions than the display field such as the gauge face 5 and the liquid crystal display 8 from being viewed by the users.

The speedometer 4A is used to present the vehicle speed information to the users, and comprises a gauge face 5 having a display field 50 constituted by scales 52, numbers 51, and etc, a decorative circular member 6, a pointer 2 configured to indicate a position on the display field 50 based on input received from the measurement, and an instrument 10 configured to drive the pointer 2 (hereinafter, a moving instrument 10).

The display field 50 is linearly arranged along the elongated gauge face 5 mounted to the case 3.

The circular member 6 has a shape similar to the gauge face 5. The circular member 6 is attached to the background panel 7 along the periphery of the window. In other words, the circular member 6 attached to the background member 7, when viewed by the users, appears to surround the outer periphery of the gauge face 5.

The pointer 2 has a conical shape, more specifically, a tapered end. If the pointer 2 approaches the end portion on the display field 50, it has thinner and narrower tip portion. The pointer 2 is arranged perpendicular to the longitudinal direction of the gauge face 5 (i.e. the display field 50). The pointer 2 traverses across the gauge face 5 along its longitudinal direction (i.e. horizontal direction) by means of the moving instrument 10.

As shown in FIG. 2, the moving instrument 10 is shown to include a cord-like flexible member 11 connected to the pointer 2, a tension pulley 12 configured to respectively wind up the both ends 11a and 11b of the flexible member 11, a driven pulley 13 spaced apart from the tension pulley 12 and configured to roll the center portion of the flexible member 11 therethough, a winding-up pulley 15 disposed between the tension pulley 12 and the driven pulley 13 and configured to roll up the flexible member 11, more specifically, the flexible member 11 ranging between the tension pulley 12 and the driven pulley 13, a motor 14 configured to rotate the winding-up pulley 15 based on input received from the measurement thus causing the connection between the flexible member 11 and the pointer 2 to move across the display field 50, and a tension member such as spring 16 configured to provide the flexible member with sufficient tension to prevent sag or looseness of the flexible member 11.

Preferably, the flexible member 11 may be formed of insulating material such as cotton, hemp, chemical fiber, and synthetic resin. In the gauge in accordance with this embodiment of the present invention, the flexible member 11 is formed of cotton. While the cord-like flexible member 11 is employed in this embodiment of the present invention, the flexible member 11 is not limited thereto. For example, a belt-like flexible member 11 may be employed in the present invention.

The tension pulley 12 comprises a cylindrical body 12a and a pair of disc-like flanges 12b, 12c each having a diameter larger than that of the cylindrical body 12a and respectively disposed on both ends of the cylindrical body 12a. The tension pulley 12 is floating around a shaft P1 connected to the center of the cylindrical body 12a, the shaft P1 being attached to the case 3.

As shown in FIG. 3, both ends 11a and 11b of the flexible member 11 coils around the outer periphery of the cylindrical body 12a. The length of the end 11a of the flexible member 11, which is uncoiled from the tension pulley 12 during the migration of the pointer from its initial position, is longer than the migration distance of the pointer 2. The pointer 2 is in its initial position in which the pointer 2 points to indicia representing zero.

The tension pulley 12 is shown to include a protruding portion configured to secure the end 11a of the flexible member 11 thereto and thus preventing the end 11a of the flexible member 11 from deviating from the tension pulley 12, as a controlling device, a first notched portion 22 (shown in FIG. 4), a portion for engaging the spring 24, a portion for inserting the spring 23, and a second notched portion 25.

The protruding portion 21 projects from one flange 12b toward another flange 12c and has a shape of cylinder. The first notched portion 22 is formed by cutting off a portion of the other flange 12c for passing the protruding portion 21 therethrough. The end 11a of the flexible member 11 that coils around the cylindrical body 12*a* passes though the notched portion 22, is drawn into the inside of the cylindrical body 12*a*, and engages with the protruding portion 21. That is to say, the end 11*a* of the flexible member 11 coils around the protruding portion 21.

The portion for engaging the spring 24 projects from the one flange 21*b* toward another flange 12*c*, and has a shape of cylinder. The portion for inserting the spring 23 is formed cutting off an elongated portion from the flange 12*c*. The second notched portion 25 is formed cutting off a portion from the flange 12*c*, directly communicating with both the outside of the flange 12*c* and with the portion for inserting the spring 23.

The spring 16 comprises a coil spring that a wire is coiled. The spring 16 is inserted into the cylindrical body 12*a* through the portion for inserting the spring 23, and one end thereof then coils around the portion for inserting the spring 23. The other end 11*b* of the flexible member 11 which coils around the cylindrical member 12*a* passes though the second notched portion 25, is drawn into the inside of the cylindrical body 12*a*, and then engages with the other end of the spring 16. The spring 16 is configured to pull the other end 11*b* of the flexible member 11 in a direction where a distance ranging between the tension pulley 12 and the driven pulley 13 is minimized in order to prevent sag or looseness of the flexible member 11. The spring 16 can be employed not only as a controlling device for preventing the other end 11*b* of the flexible member 11 from deviating from the tension pulley 12 but also as a tension member.

The driven pulley 13 comprises a cylindrical body 13*a* and a pair of disc-like flanges 13*b*, 13*c* each having a diameter larger than that of the cylindrical body 13*a* and respectively disposed on both ends of the cylindrical body 13*a*. The driven pulley 13 is floating around a driven pulley shaft P2 connected to the center of the cylindrical body 13*a*. The driven pulley shaft P2 is attached to the case 3, and disposed in parallel to the tension pulley shaft P1. The center portion of the flexible member 11 is configured to coil around the driven pulley 13.

The winding-up pulley 15 comprises a cylindrical body 15*a* and a pair of disc-like flanges 15*b*, 15*c* each having a diameter larger than that of the cylindrical body 15*a* and respectively disposed on the both ends of the cylindrical body 15*a*. As shown in FIG. 3, the flexible member 11 disposed between the tension pulley 12 and the driven pulley 13 coils around the cylindrical body 15*a* of the winding-up pulley 15. An output shaft P3 of the motor 14 is connected to the center of the cylindrical body 15*a* of the winding-up pulley 15. The winding-up pulley 15 rotates about the output shaft P3 as the output shaft P3 rotates. The output shaft P3 is disposed in parallel to both the tension pulley shaft P1 and the driven pulley shaft P3.

The motor 14 is connected to a device for measuring vehicle velocity (not shown) mounted to the vehicle, and is provided with the output shaft P3, the output shaft P3 being configured to rotate based on input received from the measurement.

In the foregoing construction of the speedometer 4A, as the output shaft P3 of the motor 14 rotates based on the measurement obtained by means of the afore-mentioned device for measuring vehicle velocity, and then it rotates the winding-up pulley 15, thus causing the flexible member 11 to move in its longitudinal direction. For example, when the winding-up pulley 15 rotates in a clockwise direction, one end 11*a* of the flexible member 11 is uncoiled from the tension pulley 12 causing the pointer 2 to move from the zero indicia to 160 indicia. When the winding-up pulley 15 rotates in a counter-clockwise direction, one end 11*a* of the flexible member 11 coils around the tension pulley 12 causing the pointer 2 to move from 160 indicia to the zero indicia. With such a construction, the pointer 2 can point to the indicia on the display field 50 of the gauge face 5 thus allowing the user to see the vehicle velocity.

As shown in FIG. 1, the liquid crystal display 8 is disposed between the tension pulley 12 and the driven pulley 13, and resides within the area surrounded by the flexible member 11, which is substantially supported by the tension pulley 12 and the driven pulley 13.

In accordance with this embodiment of the present invention, the speedometer 4A is provided with the moving instrument 10 configured to move the flexible member 11 supported by the tension pulley 12 and the driven pulley 13 in its longitudinal direction (i.e. horizontal direction) thereby causing the pointer 2 to move. With such a construction, the display field 50 of the speedometer 4A can be arranged in a linear pattern, and thus allowing for the combination meter 1 having such a new and attractive display field 50.

Furthermore, for example, as shown in FIG. 1, it is also possible to form other gauges or meters such as the fuel gauge 4B, the temperature gauge 4C than the speedometer 4A in the area defined by the tension pulley 12 and the driven pulley 13. In this case, a plurality of gauges or meters can be arranged adjacent to each other, thus allowing the vehicle combination meter 1 to hold high levels of freedom in the arrangement or layout of the gauges therein.

Also, in accordance with the embodiment of the present invention, there is provided the spring 16 which is configured to prevent sag or looseness of the flexible member 11. With such a simple and low-cost construction, it is possible to present the pointer 2 a precise position on the gauge face indicia, despite time's passage.

The spring 16 is configured to pull the flexible member 11 in its longitudinal direction so that the distance (i.e. length) of the flexible member 11 ranging between the tension pulley 12 and the driven pulley 13 is minimized. In other words, the flexible member 11 can be pulled without any movement of three pulley, the tension pulley 12, the driven pulley 13, and the winding-up pulley. Accordingly, as compared with the conventional tension member 119A or 119B as shown in FIG. 8, this embodiment of the present invention is not required to consider, for example, the frictional resistance between a shaft for supporting the pulleys 116A or 116B and a shaft bearing, and thus does not need high-torque motors 113A and 113B. The vehicle combination meter in accordance with this embodiment of the present invention can employ a low-torque motor as compared with the conventional vehicle combination meter 100 equipped with a high-torque motors 113A and 113B, thus causing the manufacture cost of the combination meter 1 to remarkably decrease.

Further, since the winding-up pulley 15 is directly connected to the motor 14, tension produced by pulling the spring 16 can be prevented from being directly transmitted into the output shaft P3 of the motor 14. Accordingly, the fictional resistance between the output shaft P3 and the bearing of the winding-up pulley 15 can be prevented from being produced, and thus a high torque-motor as needed in the conventional vehicle combination meter will not needed any longer. In this case, it is also possible to lower the strength of the shaft bearing of the winding-up pulley 15 and the output shaft P3 of the motor 14, thus allowing for the use of less expensive motor 14 and winding-up pulley 15.

Figure 4:
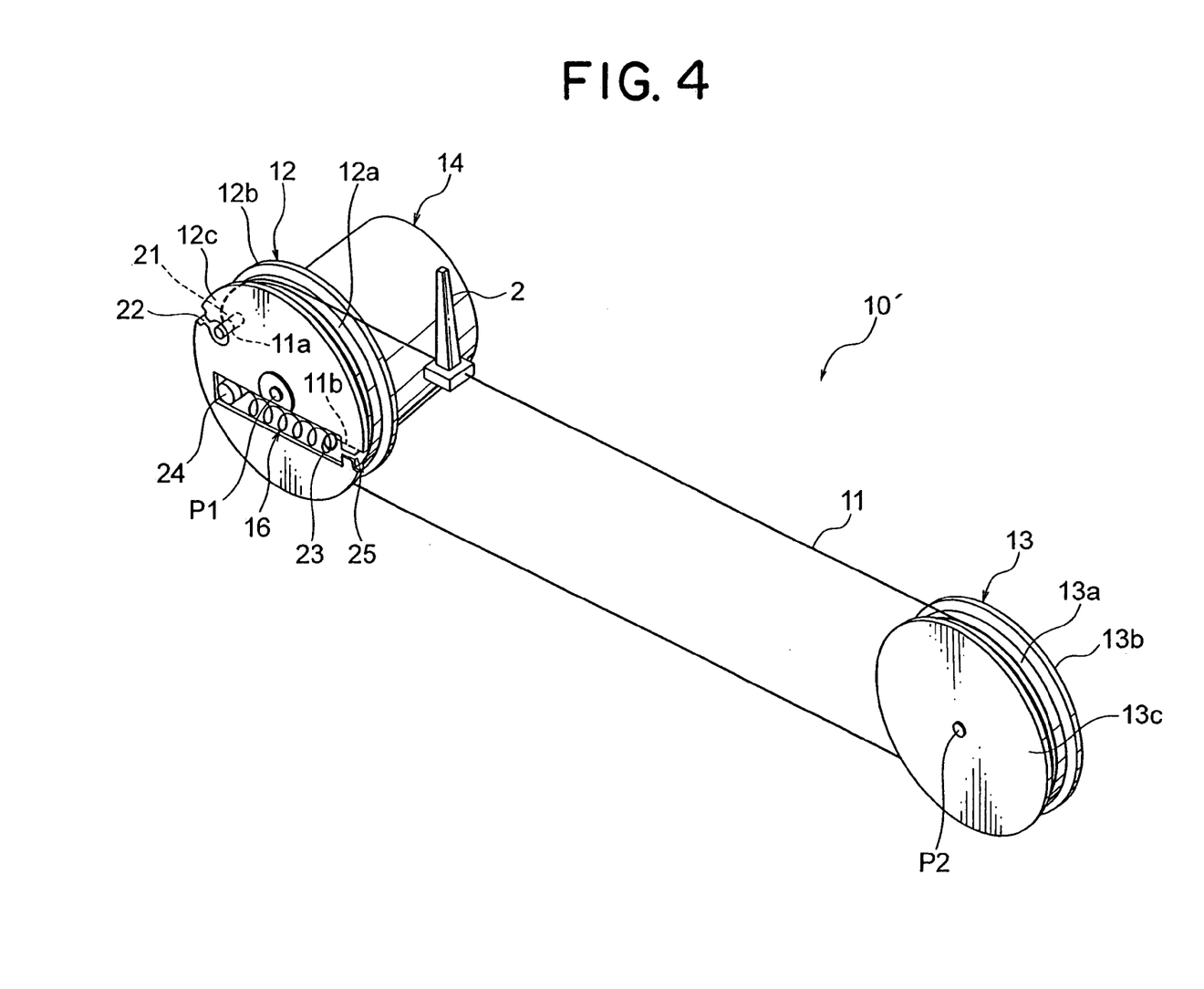
FIG. 4 is a perspective view of a moving instrument in accordance with a modified version of the first embodiment of the present invention as shown in FIG. 1.

Referring now to FIG. 4, the modified version of the foregoing first embodiment of the present invention will be illustrated. In FIG. 4, as far as possible, like reference numerals indicate like parts in FIGS. 1 to 3. The detailed explanations with respect to the like parts as described above will be omitted.

The combination meter in accordance with this modified version of the first embodiment of the present invention has a moving instrument 10' instead of the moving instrument 10. The moving instrument 10' does not include the wining-up pulley 15 as shown in FIG. 1, and includes the motor 14 directly connected to the tension pulley 12.

The combination meter in accordance with this embodiment of the present invention does not necessarily comprise the winding-up pulley 15, which means that the combination meter in accordance with this embodiment of the present invention may have the winding-up pulley 15. In the combination meter in accordance with this embodiment of the present invention, the motor 14 may be directly connected to the tension pulley 12. In this case, the number of parts to be conventionally required can be remarkably reduced and thus allowing the overall size of the speedometer 4A to be minimized.

Figure 5:
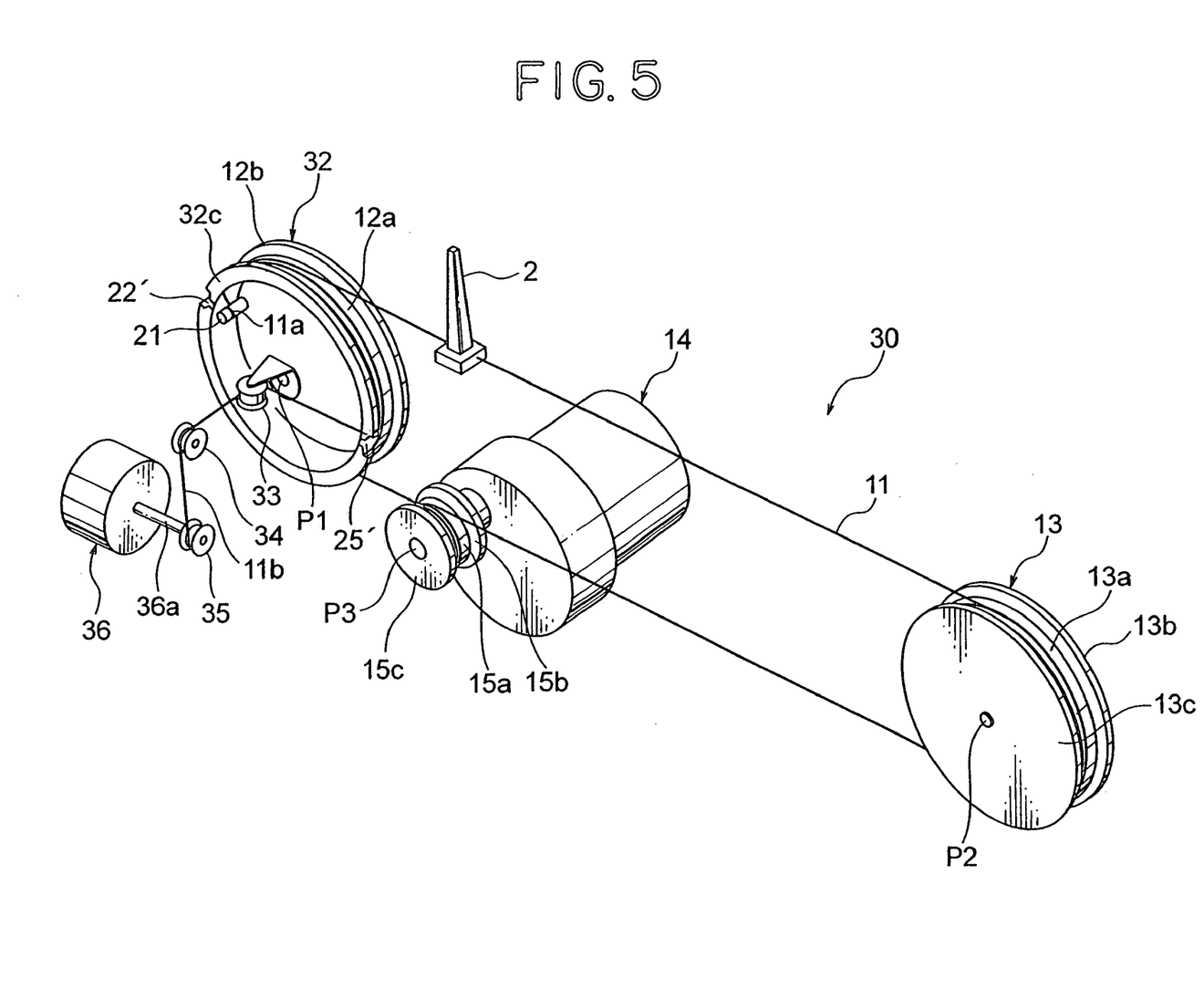
FIG. 5 is a perspective view of a moving instrument of a gauge in accordance with a second embodiment of the present invention.

Referring now to FIG. 5, the second embodiment of a moving instrument in accordance with the present invention will be illustrated. Throughout FIGS. 1 to 5, as far as possible, like reference numerals indicate like parts. The detailed explanations with respect to the like parts as described above will be omitted.

As shown in FIG. 5, a gauge in accordance with a second embodiment of the present invention has a moving instrument 30 instead of the moving instrument 10 as shown in FIG. 1. The moving instrument 30 is shown to include the flexible member 11 connected to the pointer 2, a tension pulley 32 configured to respectively wind up the both ends 11a and 11b of the flexible member 11, the driven pulley 13 spaced apart from the tension pulley 32, the winding-up pulley 15 disposed between the tension pulley 12 and the driven pulley 13, the motor 14 configured to rotate the winding-up pulley 15 based on input received from measurement, a motor 36 configured to prevent sag or looseness of the flexible member 11 as a tension member, and pulleys 33, 34.

The tension pulley 32 comprises the cylindrical body 12a, the disc-like flange 12b having a diameter larger than that of the cylindrical body 12a and disposed on one end of the cylindrical body 12a, and a circular flange 32c extending outwardly from the other end of the cylindrical body 12a. The tension pulley 32 is floating around a shaft P1 connected to the center of the cylindrical body 12a.

The tension pulley 32 is shown to include the afore-mentioned protruding portion 21 (i.e. controlling device) and two notched portions 22' and 25' each formed by cutting off an area extending from the outer periphery to the inner periphery of the flange 32c. The end portion 11a of the flexible member 11 will pass through the notched portion 22' and then be led into the cylindrical body 12a. Thereafter, the flexible member 11 will engages with the protruding portion 21 along the outer periphery of the protruding portion 21. On the other hand, the other end portion 11b of the flexible member 11 which has been led into the cylindrical body 12a through the notched portion 25' is guided to the motor 36 by means of the pulleys 33, 34, and then engages with a pulley 35 of the motor 36.

The motor 36 is disposed in the vicinity of the tension pulley 32. The motor 36 comprises an output shaft 36a, and the pulley 35 mounted to the output shaft 36a and configured to engage with the other end 11b of the flexible member 11. Thereafter, the other end 11b of the flexible member 11 engages with and secures to the pulley 35.

The pulley 33 engages with the flange 12b of the tension pulley 32 while holding freedom of movement. The pulley 34 also engages with the case 3 while holding freedom of movement. These pulleys 33 and 34 abut against the flexible member 11 so that the flexible member 11 disposed ranging between the pulley 34 and the pulley 35 is perpendicular to the output shaft 36a of the motor 36, and the other end 11b of the flexible member 11 is guided to the motor 36.

By means of the moving instrument 30, the other end 11b of the flexible member 11 coils around the pulley 35 as the output shaft 36a of the motor 36 rotates. In other words, the motor 36 is configured to pull the other end 11b of the flexible member 11 in a direction where a distance between the tension pulley 32 and the driven pulley 13 is minimized in order to prevent sag or looseness of the flexible member 11. The motor 36 acts as a tension member and also acts as a controlling device for preventing the other end 11b of the flexible member 11 from deviating from the tension pulley 32.

In accordance with this embodiment of the present invention, the tension member corresponds to the motor 36 configured to wind up the flexible member 11 connected to the other end 11b of the flexible member 11. With such a construction, even if the flexible member 11 become loose over time, it is possible to prevent sag or looseness of the flexible member 11. As a result, the pointer 2 is given a precise position on the gauge face indicia.

Figure 6:
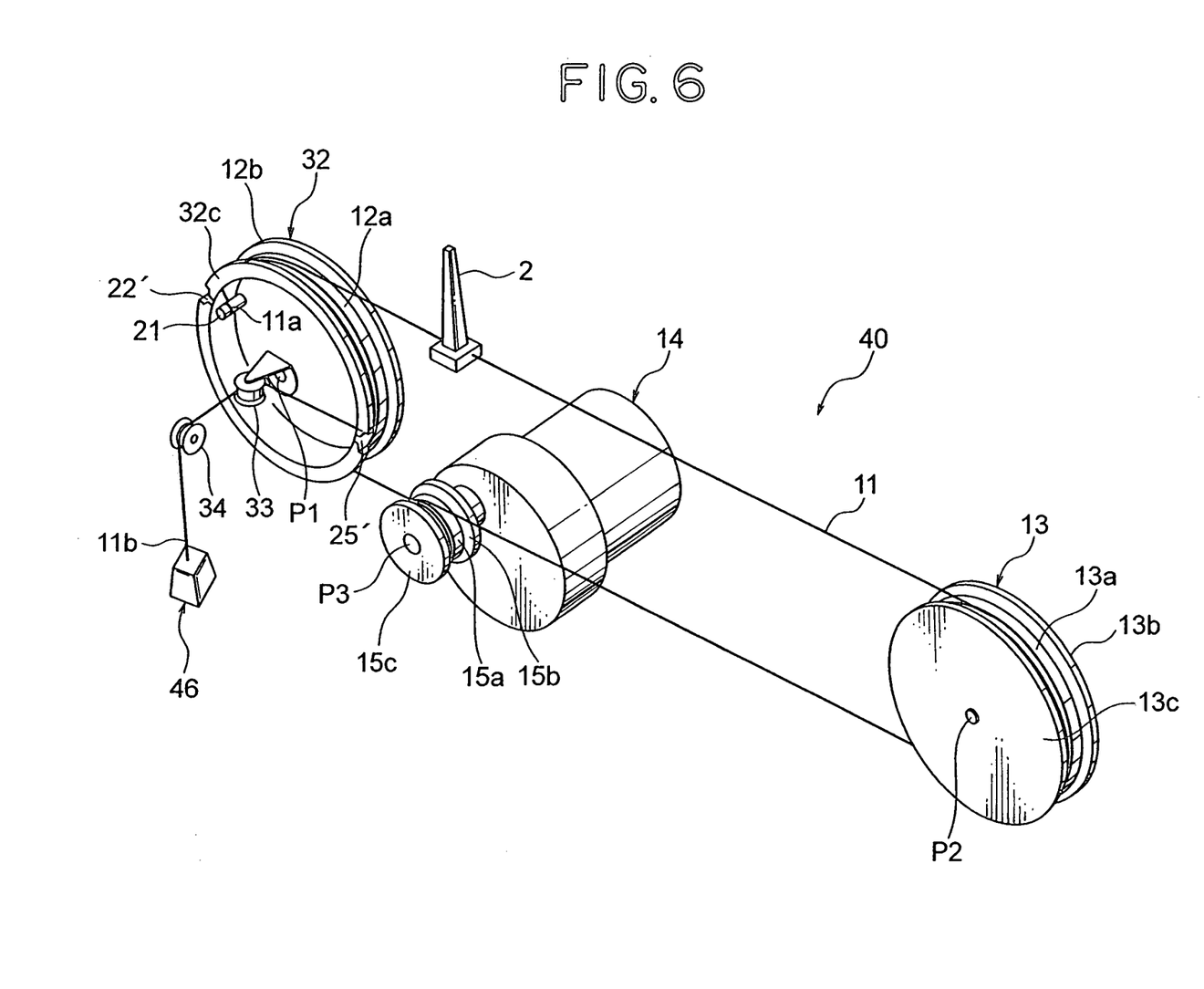
FIG. 6 is a perspective view of a moving instrument of a gauge in accordance with a third embodiment of the present invention.

Referring now to the FIG. 6, a gauge of a third embodiment in accordance with the present invention will be illustrated. Throughout FIGS. 1 to 6, as far as possible, like reference numerals indicate like parts. The detailed explanations with respect to the like parts as described above will be omitted.

As shown in FIG. 6, a combination meter (i.e. a gauge) of the third embodiment in accordance with the present invention has a moving instrument 40, instead of the moving instrument 30 as shown in FIG.5. The moving instrument 40 is shown to include the flexible member 11 connected to the pointer 2, a tension pulley 32 configured to respectively wind up the both ends 11a and 11b of the flexible member 11, the driven pulley 13 spaced apart from the tension pulley 32, the winding-up pulley 15 disposed between the tension pulley 12 and the driven pulley 13, the motor 14 configured to rotate the winding-up pulley 15 based on input received from measurement, a weight 46 configured to prevent sag or looseness of the flexible member 11 as a tension member, and pulleys 33 and 34.

The spindle 46 is attached to the other end 11b of the flexible member 11. The weight 46 is configured to pull the other end 11b of the flexible member 11 in a direction where a distance from the tension pulley 32 to the driven pulley 13 is minimized in order to prevent sag or looseness of the flexible member 11. The weight 46 acts as a tension member and also acts as a controlling device for preventing the other end 11b of the flexible member 11 from deviating from the tension pulley 32.

In accordance with this embodiment of the present invention, the tension member corresponds to the weight 46 connected to the other end 11b of the flexible member 11. With such a construction, even if the flexible member 11 become loose over time, it is possible to prevent sag or looseness of the flexible member 11. As a result, the pointer 2 is given a precise position on the gauge face indicia.

In accordance with this embodiment of the present invention, the tension member such as the spring 16, the motor 36 and the weight 46 is only attached to the other end 11b of the flexible member 11. However, the foregoing tension member may be attached to both ends 11a and 11b of the flexible member 11.

While the vehicle combination meter (i.e. the vehicle gauge) 1 in accordance with the foregoing embodiment of the present invention includes the speedometer 4A, the fuel gauge 4B, and the temperature gauge 4C, the vehicle combination meter 1 does not necessarily have a plurality of gauges. For example, the vehicle combination meter 1 in accordance with the present invention may have just only speedometer 4A.

While the display field 50 is formed in a linear pattern in accordance with the desired embodiment of the present invention, it may be formed in an arcuate pattern. In the case of the display field formed in an arcuate pattern, the driven pulley 13 may be replaced with an arcuate frame which is disposed along the arcuate pattern of the display field.

Throughout the specification, a "gauge" is interchangeably used with a "combination meter".

Hereinafter, the advantageous effects that can be attained by the present invention will be described.

Because the gauge in accordance with the first embodiment of the present invention has the tension member configured to provide at least one end of the flexible member with sufficient tension to prevent sag or looseness of the flexible member disposed between the first pulley and the second pulley, the gauge presenting the pointer a precise position on the gauge face indicia and having a lightly loaded motor can be achieved.

In the foregoing gauge, in a case where the tension member is particularly a spring both ends of which are respectively coupled to the first pulley and to one end of the flexible member, the gauge presenting the pointer a precise position on the gauge face indicia and having a lightly loaded motor can be achieved with a less complicated structure and low manufacture cost.

In the foregoing gauge, in a case where the tension member is particularly the motor operable to wind up the flexible member that becomes loose over time, it is possible to prevent sag or looseness of the flexible member.

In the foregoing gauge, in a case where the tension member is particularly the weight arranged for connection to one end of the flexible member that becomes loose over time, it is possible to prevent sag or looseness of the flexible member.

In the foregoing gauge, in a case where the winding-up pulley is particularly disposed between the first pulley and the second pulley, directly coupled to the motor, and configured to wind up the flexible member, tension produced by the tension member can be prevented from being directly transmitted into the output shaft of the motor. Accordingly, the gauge having a lightly loaded motor can be achieved.

In the foregoing gauge, in a case where indicia are particularly arranged in a linear pattern on the gauge face, the gauge having a visually attractive appearance can be achieved.

Changes and modifications in the specifically described embodiments would come within the scope of the invention, which is intended to be limited only by the scope of the appended claims, as interpreted according to the principles of patent law.

What is claimed is:

1. A gauge, comprising:
   (a) a gauge face having indicia;
   (b) a pointer configured to indicate a position on the gauge face based on input received from measurement; and
   (c) an instrument for driving the pointer, comprising:
   a flexible member connected to the pointer;
   a first pulley configured to respectively wind up both ends of the flexible member;
   a controlling device for preventing the flexible member from deviating from the first pulley;
   a second pulley spaced apart from the first pulley and configured to roll up the center portion of the flexible member;
   a motor configured to rotate the first pulley based on input received from the measurement and to drive the pointer about the gauge face;
   a winding-up pulley coupled to the motor, and configured to at least partially roll up and move the flexible member disposed between the first pulley and the second pulley;
   a tension member configured to provide one end portion of the flexible member with sufficient tension to prevent sag or looseness of the flexible member disposed between the first pulley and the second pulley
   a mounting portion for carrying or retaining the one end portion of the flexible member, wherein the flexible member is suited to substantially make a circuit of the first pulley from the mounting portion, turn at the second pulley, travel around the winding-up pulley, reach the first pulley, and bind to the tension member such that the length of the flexible member which is uncoiled from the first pulley during the traveling of the pointer from its initial position is longer than the travel distance of the pointer.

2. The gauge according to claim 1, wherein the tension member is a spring, both ends of which are respectively coupled to the first pulley and to one end of the flexible member.

3. The gauge according to claim 1, wherein the tension member is a motor operable to wind up the flexible member.

4. The gauge according to claim 1, wherein the tension member is a weight arranged for connection to one end of the flexible member.

5. The gauge according to claim 1, wherein the indicia are arranged in a linear pattern on the gauge face.

* * * * *